(12) United States Patent
Bono et al.

(10) Patent No.: US 11,023,415 B2
(45) Date of Patent: Jun. 1, 2021

(54) REDUCING FEATURE DEPENDENCIES OF BLOCK STORAGE USED TO BACK NAS CLUSTER

(71) Applicant: EMC IP Holding Company LLC, Hopkinton, MA (US)

(72) Inventors: Jean-Pierre Bono, Westborough, MA (US); Sudhir Srinivasan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 237 days.

(21) Appl. No.: 16/263,040

(22) Filed: Jan. 31, 2019

(65) Prior Publication Data
US 2020/0250133 A1 Aug. 6, 2020

(51) Int. Cl.
| | | |
|---|---|---|
| G06F 16/11 | (2019.01) | |
| G06F 16/13 | (2019.01) | |
| G06F 11/20 | (2006.01) | |
| G06F 16/188 | (2019.01) | |
| G06F 16/174 | (2019.01) | |
| G06F 9/455 | (2018.01) | |
| G06F 16/182 | (2019.01) | |

(52) U.S. Cl.
CPC ........ *G06F 16/128* (2019.01); *G06F 9/45558* (2013.01); *G06F 11/2033* (2013.01); *G06F 11/2064* (2013.01); *G06F 11/2069* (2013.01); *G06F 16/13* (2019.01); *G06F 16/1744* (2019.01); *G06F 16/1748* (2019.01); *G06F 16/183* (2019.01); *G06F 16/188* (2019.01); *G06F 2009/45562* (2013.01); *G06F 2009/45579* (2013.01)

(58) Field of Classification Search
CPC ............. G06F 11/1463; G06F 12/0868; G06F 16/2228; G06F 11/1435; G06F 16/54; G06F 16/27

See application file for complete search history.

(56) References Cited

U.S. PATENT DOCUMENTS

| | | | | |
|---|---|---|---|---|
| 6,829,617 | B2 * | 12/2004 | Sawdon | G06F 11/1435 |
| 9,495,409 | B1 * | 11/2016 | Revur | G06F 16/27 |
| 9,612,754 | B1 * | 4/2017 | Delgado | G06F 12/0868 |
| 2004/0260673 | A1 * | 12/2004 | Hitz | G06F 11/1435 |
| 2011/0119634 | A1 * | 5/2011 | Bhatt | G06F 16/54 |
| | | | | 715/854 |
| 2018/0046632 | A1 * | 2/2018 | Iwasaki | G06F 16/2228 |

(Continued)

OTHER PUBLICATIONS

Bono, Jean-Pierre; "Archiving NAS Servers to the Cloud," U.S. Appl. No. 15/884,687, filed Jan. 31, 2018.

(Continued)

*Primary Examiner* — Etienne P Leroux
(74) *Attorney, Agent, or Firm* — BainwoodHuang

(57) ABSTRACT

A technique for managing data objects in a data storage cluster realizes an application-accessible data object within a file that belongs to an internal file system. The internal file system runs on a computing node of the cluster and is backed by a LUN realized in block storage. The storage cluster achieves snapshots of the data object at the level of the file system, e.g., by snapshotting the file, such that the data object and its snapshots are all backed by the same LUN in the block storage.

18 Claims, 7 Drawing Sheets

(56) References Cited

U.S. PATENT DOCUMENTS

2018/0300205 A1* 10/2018 Sehgal ............... G06F 11/1453

OTHER PUBLICATIONS

Bono, Jean-Pierre, et al.; "Enabling Granular Snapshots and Provisioning in NAS (Network Attached Storage) Clusters," U.S. Appl. No. 15/666,863, filed Aug. 2, 2017.
Bono, Jean-Pierre; "Managing Data Using Network Attached Storage (NAS) Cluster," U.S. Appl. No. 15/664,366, filed Jul. 31, 2017.
Bono, Jean-Pierre; "Unified Datapath Architecture," U.S. Appl. No. 13/828,322, filed Mar. 14, 2013.

* cited by examiner

REDUCING FEATURE DEPENDENCIES OF BLOCK STORAGE USED TO BACK NAS CLUSTER

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from hosts applications, which run on separate computers or within the data storage system. The storage requests specify blocks, files, and/or other data elements to be written, read, created, deleted, and so forth. Software running on the storage processors manages incoming storage requests and performs various data processing tasks to organize and secure the data elements on the non-volatile storage devices.

Some storage systems provide block-based storage, for storing LUNs (Logical UNits), which hosts may access using block-based protocols, such as SCSI (Small System Computer Interface), iSCSI (Internet SCSI), and/or Fibre Channel. Other storage systems provide file-based storage, for storing file systems, which hosts may access using file-based protocols, such as NFS (Network File System) or CIFS (Common Internet File System). Still other storage systems support both block-based and file-based storage, such that the same systems allow hosts to access both LUNs and file systems.

SUMMARY

Consumers of data storage equipment increasingly demand high system availability and avoidance of data loss. To meet these demands, some manufacturers are turning their focus to data storage clusters. Storage clusters are envisioned to include many computing nodes that operate with a variety of diverse storage technologies.

One such cluster is expected to decouple computing nodes from underlying block storage, provided in the form of LUNs. The computing nodes may access the LUNs and deploy host-accessible file systems thereupon, e.g., in a NAS (Network Attached Storage) arrangement. Clusters may be localized to a single site or may be distributed across multiple sites, including the cloud.

In some arrangements, the computing nodes rely upon the underlying block storage to meet certain requirements. These requirements include the abilities to provision LUNs, to take snapshots (point-in-time versions) of LUNs, to map LUNs to iSCSI targets, and/or to scale in any of these respects.

Unfortunately, not all of the diverse types of block storage with which the cluster is desired to function support all of these requirements. For example, some do not support snapshots or they support only a small number of snapshots. Others are limited in the number of iSCSI targets to which they can map, limiting their ability to connect to many computing nodes.

To address these shortcomings in various block storage technologies, an improved technique for managing data objects in a data storage cluster realizes an application-accessible data object within a file that belongs to an internal file system. The internal file system runs on a computing node of the cluster and is backed by a LUN realized in block storage. The storage cluster achieves snapshots of the data object at the level of the file system, e.g., by snapshotting the file, such that the data object and its snapshots are all backed by the same LUN in the block storage. As a result, any dependency on the block storage for snapshots is removed, as the computing node performs the snapshots instead of the block storage and depends only upon a single LUN from the block storage to back the data object and its snapshots.

In some examples, the data object, which is realized within the file, is an application-accessible file system. In other examples, the data object is an application-accessible LUN. When realizing a LUN, the computing node is unencumbered by limitations on the number of mapped LUNs allowed by the block storage, as the computing node itself can provide the iSCSI targets for all the LUNs it realizes.

By removing dependencies on the block storage, the improved technique greatly expands the scope of block-storage technologies that are available for use by the storage cluster, without sacrificing functionality. For example, the storage cluster can operate with any combination of local storage, storage arrays, cloud storage, vSAN (virtual Storage Area Network), and/or software-defined storage.

In some examples, the improved technique supports data mobility across diverse block-storage technologies, e.g., to support replication, migration, load balancing, disaster recovery, and/or failover, which may include failing over from a local array to the cloud and back.

In some examples, the computing node that employs the internal file and file system for realizing the data object may establish a mirror with a data object on another computing node that does not use an internal file or file system. For instance, the other computing node may connect to or reside within an array that already meets all snapshot and LUN-mapping requirements, such that no internal file or file system is necessary.

In some examples, the storage cluster supports late binding of writes by providing a data log stored in a common LUN in the block storage. The data log receives newly arriving writes directed to a data object hosted by a computing node of the cluster, persists the data specified by the writes, and later destages the data to the data object out of band with the arriving writes. According to some variants, the computing node performs inline compression and/or deduplication when destaging the data to the data object. According to further variants, the common LUN that stores the data log is accessible by another computing node in the cluster. A mirror is established between the data object and a replica thereof on the other computing node. In the event of the failure of the computing node that hosts the data object, operation fails over to the other computing node, which accesses the data log stored in the common LUN and destages the pending writes to the replica, thereby preserving consistency between the data object and the replica.

Certain embodiments are directed to a method of managing data objects in a data storage cluster. The method includes deploying a file system within a data node of the data storage cluster, the file system backed by a LUN (Logical UNit) formed within block storage, the file system and the LUN each having an address space wherein addresses in the file system correspond, one-to-one, with respective addresses in the LUN. The method further includes realizing a data object within a file of the file system, the data object being accessible to an application program, the file system having a first inode allocated to the file, the first inode pointing to data of the file. The method still further includes generating a snapshot of the data object by allocating a second inode in the file system and pointing the second inode to the data of the file.

Other embodiments are directed to a data storage cluster including multiple computing nodes, including a data node having control circuitry that includes a set of processing units coupled to memory, the control circuitry constructed and arranged to perform a method of managing data objects in the data storage cluster, such as the method described above.

Still other embodiments are directed to a computer program product. The computer program product stores instructions which, when executed on control circuitry of a data node of a data storage cluster, cause the control circuitry to perform a method of managing data objects in the data storage cluster, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for managing data objects in a data storage cluster realizes an application-accessible data object within a file that belongs to an internal file system. The internal file system runs on a computing node of the cluster and is backed by a LUN realized in block storage. The storage cluster achieves snapshots of the data object at the level of the file system, e.g., by snapshotting the file, such that the data object and its snapshots are all backed by the same LUN in the block storage.

Figure 1:
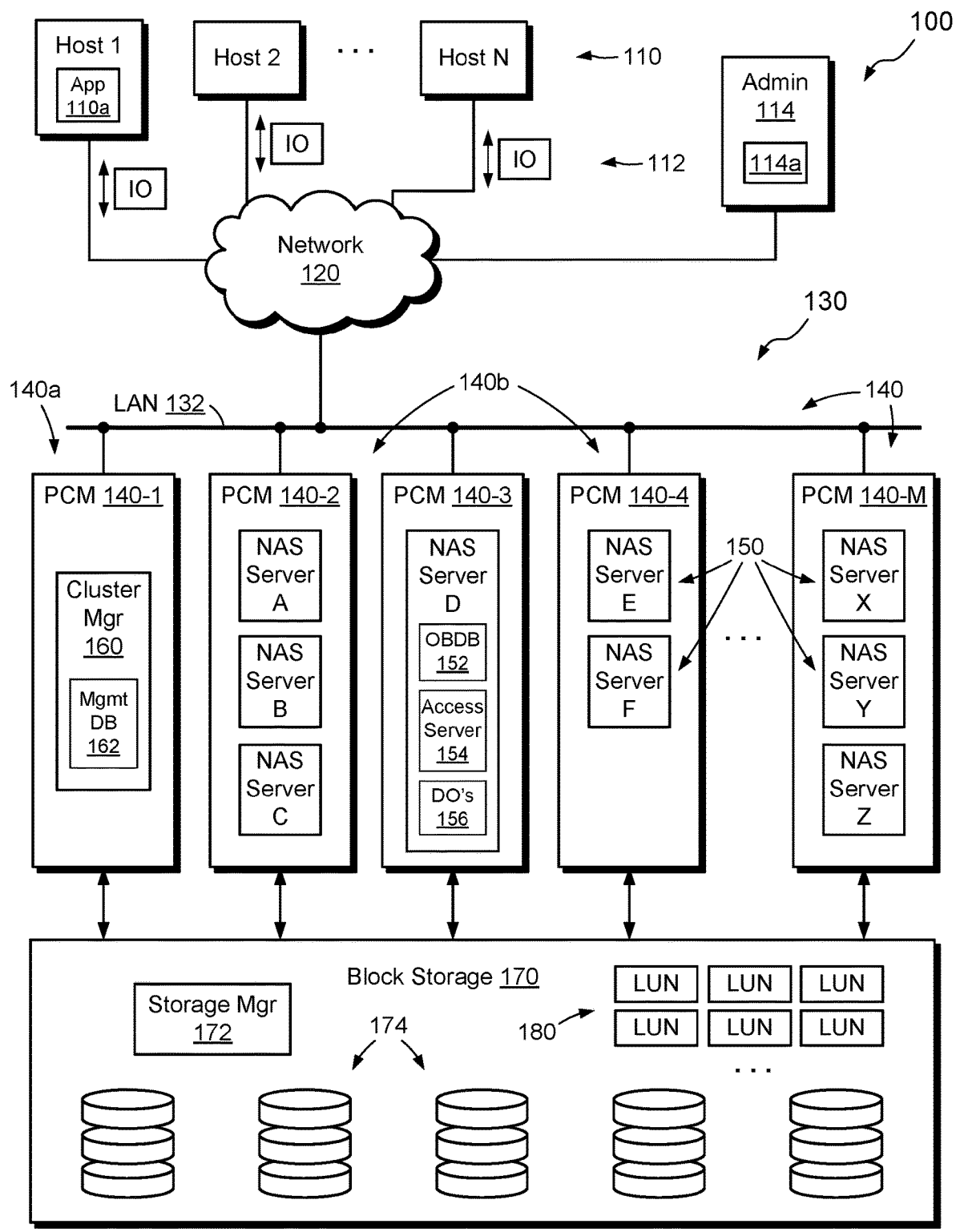
FIG. 1 is a block diagram of an example storage cluster and environment in which embodiments of the improved technique can be practiced.

FIG. 1 shows an example platform for realizing a data storage cluster in which embodiments of the improved technique can be practiced. The storage cluster employs any number of NAS data nodes and one or more management nodes having access to shared block storage. In an example, each node of the cluster runs a software library to support cluster operations within an operating system, such as Linux. Example implementations of the storage cluster leverage software-defined features, such as software defined storage (SDS), and may be deployed over a wide range of operating platforms, such as ESX (VMware), KVM (kernel-base virtual machine), bare metal, or containers (e.g., Docker containers).

As shown in FIG. 1, multiple hosts 110 access a storage cluster 130 over a network 120. The storage cluster 130 includes multiple physical computing machines 140 (e.g., 140-1 through 140-M) connected to one another via a computer network, such as a LAN (local area network) 132. Each of the physical computing machines 140 has access to block storage 170, which includes multiple storage drives 174, such as magnetic disk drives, electronic flash drives, NVM-e drives, and/or other types of drives. The block storage 170 includes a storage manager 172, which manages block-based storage functions and communications with external equipment. The storage manager 172 arranges the storage drives 174 as LUNs 180. Each LUN 180 may be constructed from any number of storage drives 174, from portions of such storage drives 174, or from a single portion of a single storage drive 174. As is known, clients may access data from a LUN by specifying a logical unit number and an offset.

The environment 100 further includes an administrative machine 114, such as a computer, which runs an administrative program 114a for managing the storage cluster 130. In some examples, the administrative program 114a and the storage manager 172 are provided together in a single program or set of programs. Thus, in some examples, the storage manager 172 manages not only the block storage 170 but also the storage cluster 130.

The physical computing machines 140 may be provided as circuit board assemblies, or "blades," which plug into a chassis (or multiple chassis) that encloses and cools them. Each chassis has a backplane for interconnecting the physical computing machines 140, and additional connections may be made among physical computing machines using cables. One should appreciate that no particular hardware configuration is required, however, as the physical computing machines 140 may be any type of computing devices capable of connecting to a network and processing data.

The hosts 110 may be computing devices that access the storage cluster 130 for reading and/or writing data stored therein. Examples of hosts 110 include personal computers, smart phones, tablet computers, Internet of Things (IoT) devices, workstations, enterprise servers, or any other type or types of processing devices capable of running a host application and exchanging data over a network. A particular host application 110a is specifically shown. In some examples, functionality of hosts 110 may be provided within the storage cluster 130 itself. For example, host applications may run within containers or virtual machines on any of the physical computing machines 140, such that no external hosts are necessarily involved. The network 120 may be any type of computer network, such as the Internet, a WAN (wide area network), a LAN, a SAN (Storage Area Network) or any other type of network or combination of networks. In some examples, the network 120 and the LAN 132 are provided as a single network.

The block storage 170 may be implemented in a variety of ways. In one example, a VMAX array, Storage Center array, XtremIO array, or some other type of block-based array provides the block storage for realizing LUNs 180 (VMAX, Storage Center, and XtremIO are available from Dell EMC). In such arrangements, each of the physical computing machines 140 may connect to the block storage 170 directly, via a SAN, or in some other manner. In other examples, the block storage 170 may be provided using cloud-based storage, such as Amazon Web Services (e.g., EC2 and/or EBS), Microsoft Azure, and Google Cloud, using vSAN, or using SDS, such as FlexOS, which turns direct-attached storage into shared block storage. Different types of storage technologies may be combined in any suitable way. For example, the block storage 170 may include a combination of local array storage, cloud-based storage, and/or vSAN storage.

As further shown in FIG. 1, the physical computing machines 140 may be configured as either cluster manager nodes 140a or as NAS data nodes 140b. In the example shown, which is not intended to be limiting, each physical computing machine 140 serves only one role, either as a cluster manager node or as a NAS data node, and there is only one cluster manager node for the entire storage cluster 130. As shown, physical computing machine 140-1 is configured as a cluster manager node and includes a cluster manager 160. The cluster manager 160 includes a management database 162, which contains information about the storage cluster 130 and information about the various NAS data nodes. In an example, the cluster manager 160 acts as a single entry point for control and management of the storage cluster 130.

As further shown, physical computing machines 140-2 through 140-M are configured as NAS data nodes 140b. The NAS data nodes 140b host NAS servers 150. FIG. 1 shows several NAS servers 150 (A-F and X-Z), with NAS Server D shown in additional detail (and intended to be representative of all NAS servers 150). Each NAS server 150 includes a data object database (DODB) 152, a set of access servers 154 (e.g., one or more CIFS, NFS, iSCSI, and/or Fibre Channel servers), and a set of data objects 156 that belong to the NAS server 150. The OBDB 152 provides information about each of the data objects 156, which may be provided in the form of host-accessible file systems or host-accessible LUNs, for example. The access server(s) 154 enable host access to the set of data objects 156, e.g., for reading and/or writing.

The set of data objects 156 may include production objects as well as snapshots. In a particular example, each data object and its snapshots are backed by a respective LUN 180 in the block storage 170. Also, each data object belongs to one and only one NAS server 150. A NAS data node may operate any number of NAS servers 150, and each NAS server 150 may control access to any number of data objects.

The NAS servers 150 are preferably lightweight structures, with many NAS servers 150 capable of operating within a single execution environment on a physical computing machine 140. Owing to their lightweight nature, NAS servers 150 can be quickly moved from one physical computing machine to another with little or no disruption to hosts 110. In some examples, NAS servers 150 are deployed within virtual machines or within virtualized userspace containers, e.g., Docker containers.

Although the storage cluster 130 appears to be deployed at a single location, this is merely an example. Alternatively, the storage cluster 130 may be deployed across multiple locations, including in the cloud. For example, some NAS data nodes 140b may be operated on the premises of an enterprise, such as on the property of a company or other organization, while other NAS data nodes 140b are operated off premises, such as in the cloud. In some examples, when operating NAS data nodes 140b in the cloud, host applications that access the NAS data nodes 140b also operate in the cloud, e.g., on cloud-based servers configured to run the host applications. Thus, not only may the block storage 170 be distributed, but also the computing nodes may be distributed, as well.

In example operation, hosts 110 (and/or host applications running within the cluster) issue I/O requests 112 directed to particular data objects. Access servers 154 operating within NAS data nodes 140b receive the I/O requests 112, and the respective physical computing machines process the I/O requests 112 to effect reads and/or writes of specified data. Specified data may include particular LUNs, files, directories, or portions thereof.

One should appreciate that the NAS data nodes 140b act as vehicles for moving data between hosts 110 or host applications and block storage 170 but they do not generally provide persistent storage of the data objects themselves. Rather, block storage 170 preferably provides persistent storage of the data objects for all of the NAS servers 150.

The pictured arrangement promotes mobility of NAS servers 150 among NAS data nodes 140b. For example, the cluster manager 160 orchestrates provisioning, failover, and load balancing of NAS servers 150 across NAS data nodes in an efficient manner that avoids bottlenecks. By providing an OBDB 152 with each NAS server 150, each NAS server 150 is realized as a highly self-contained structure, as it does not rely on access to any centralized database for most information about its contents. Movement of a NAS server 150 from a first NAS data node to a second NAS data node is predominantly a matter of disabling an access server 154 on the first NAS data node, starting an access server on the second NAS data node, accessing the OBDB 152 of the NAS server to identify the data objects that it contains, and connecting to the LUNs 180 in block storage 170 that provide backing store for those data objects. The self-contained nature of the NAS servers 150 also promotes scalability as it enables thousands of NAS servers to be managed by a single cluster manager 160. Additional information about an example data storage cluster suitable for use herein may be found in copending U.S. application Ser. No. 15/664,366, filed Jul. 31, 2017, the contents and teachings of which are incorporated herein by reference in their entirety.

Figure 2:
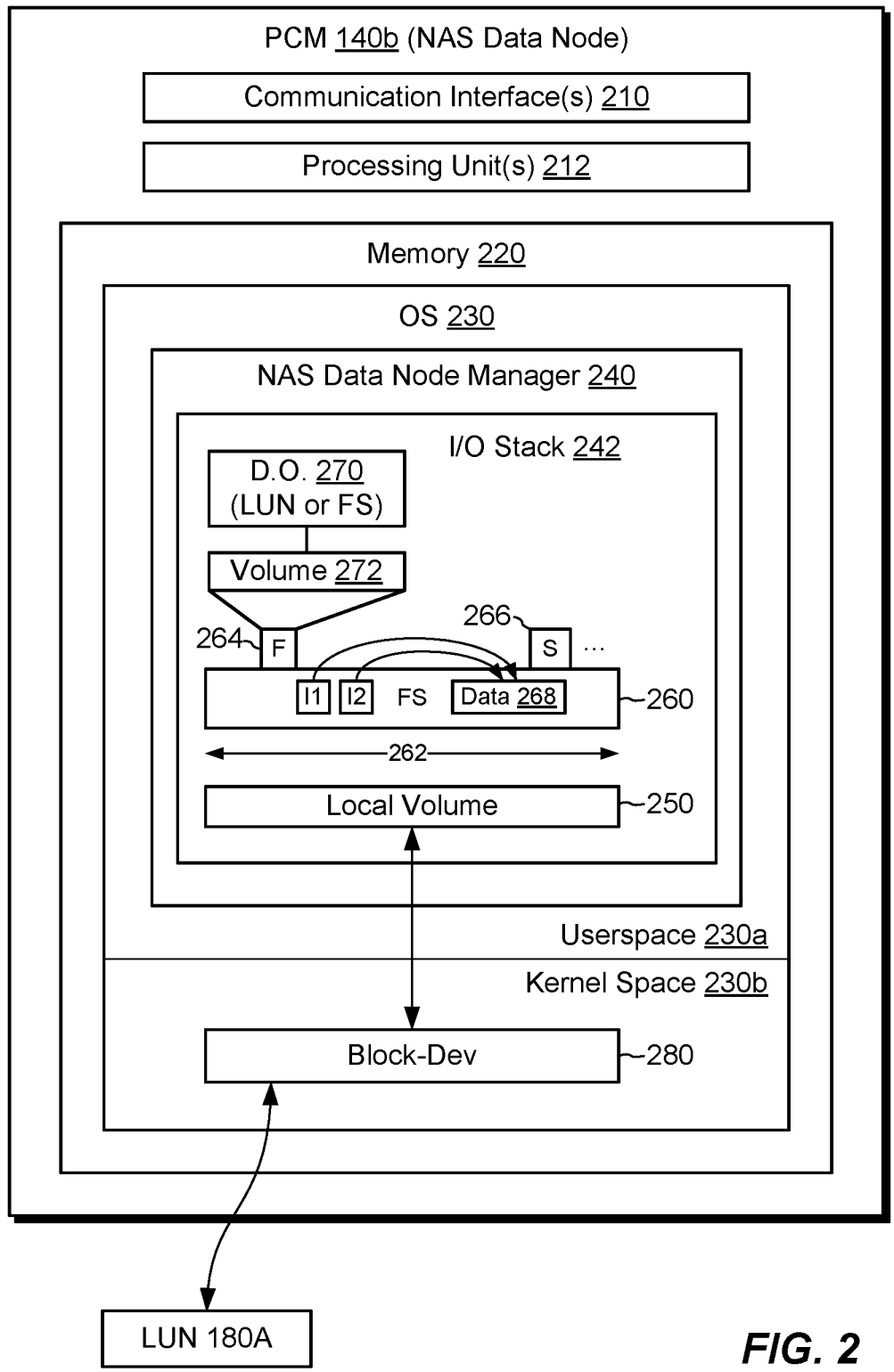
FIG. 2 is a block diagram of an example data node of FIG. 1.

FIG. 2 shows an example arrangement of a physical computing machine configured as a NAS data node 140b. NAS data node 140b includes one or more communication interfaces 210, a set of processing units 212, and memory 220. The set of processing units 212 and the memory 220 together form control circuitry, which is constructed and arranged to carry out various methods and functions as described herein. Also, the memory 220 includes a variety of software constructs realized in the form of executable instructions. When the executable instructions are run by the set of processing units 212, the set of processing units 212 of the NAS data node 140b is caused to carry out the operations defined by the software constructs. Although FIG. 2 specifically shows certain software constructs, it is understood that the memory 220 typically includes many other software constructs, such as various applications, processes, and daemons.

As further shown in FIG. 2, the memory 220 runs an operating system (OS) 230 (e.g., Linux, Unix, Windows, etc.), which includes userspace 230a and kernel space 230b. A NAS data node manager 240 runs within userspace 230a, e.g., as a userspace process, and includes an I/O stack 242. The I/O stack 242 provides an execution path within userspace 230a for processing I/O requests 112 arriving from host applications, i.e., by converting read and/or write requests directed to particular LUNs, files, or directories to corresponding block-based requests suitable for submission to lower processing levels.

As shown, a block device 280, such as a Linux block device, resides in kernel space 230b and is backed by a LUN 180a provisioned from block storage 170. A local volume 250, residing within userspace 230a, is deployed upon block device 280, and an internal file system 260 is deployed upon local volume 250. The internal file system 260 has an address space 262, denominated in blocks, where a "block" is a smallest unit of storage that the file system 260 can allocate. In an example, there is a one-to-one correspondence between each address in address space 262 of the file system 260 and a corresponding address in local volume 250, in block device 280, and in LUN 180A, such that a read or write directed to a particular block in file system 260 translates to a corresponding read or write of a corresponding block in LUN 180A. Thus, for example, the file system 260, the local volume 250, the block device 280, and the LUN 180A all have address spaces, and the address space of each corresponds one-to-one with the address space of each of the others. Providing this one-to-one correspondence simplifies interactions between the file system 260 and the block storage 170, such that communications between data nodes 140b and underlying block storage 170 may be kept to a minimum.

In an example, the cluster manager 160 directs activities to configure the illustrated arrangement. These activities include provisioning LUN 180A to NAS data node 140b, such that the operating system 230 discovers LUN 180A and expresses it as a block device 280 (e.g., a Linux block device). The NAS data node manager 240 then discovers the block device 280 and constructs local volume 250 upon it (in Linux, libaio may be used for this purpose). The NAS data node manager 240 then formats file system 260 upon local volume 250.

In cases where the LUN 180A is formed from block storage 170 that supports large numbers of snapshots and mapped LUNs, the NAS data node manager 240 may export the file system 260 directly as a host-accessible object, thereby allowing host applications to access files and directories in file system 260. In such cases, the file system 260 is not treated as "internal," but rather is presented for consumption by applications. In other cases, where the block storage 170 deriving the LUN 180A does not support snapshots, large numbers of snapshots, and/or large numbers of mapped LUNs, the NAS data node manager 240 treats the file system 260 as internal and takes additional measures to compensate for the shortcomings of the block storage 170.

As further shown in FIG. 2 and in accordance with improvements hereof, the NAS data node manager 240 creates a file 264 in file system 260, e.g., by allocating an inode (index node) I1 for the file 264. Inode I1 is a data structure, realized in one or more blocks of file system 260, which stores information about the file 264, such as its ownership, file size, and privileges. Inode I1 also includes pointers to data 268 of the file 264. The NAS data node manager 240 then deploys a host-accessible data object 270, such as a LUN or host file system, within the file 264. For example, the NAS data node manager 240 renders the logical address space of the file 264 (e.g., offsets into the file) as a volume 272, whose physical addresses correspond to the logical addresses of the file 264. To provide the data object 270 as a LUN, the NAS data node manager 240 maps the volume 272 to an iSCSI target, rendering the volume 272 as a host-accessible LUN. To provide the data object 270 as a host file system, the NAS data node manager 240 may format the host file system upon the volume 272, thereafter exporting the host-accessible file system via a network server, such as an NFS or CIFS server.

With the arrangement shown, any number of snapshots may be taken of the data object 270, i.e., the host-accessible LUN or file system, at the level of the internal file system 260, such that the data object 270 and all of its snapshots are contained within the internal file system 260. For example, the NAS data node manager 240 may generate a snapshot 266 of the data object 270 by snapping the file 264, e.g., by allocating a new inode I2 for the snapshot 266 and pointing the inode I2 to the data 268 of the file 264. In this manner, the data of the file and its snapshot are initially identical. Over time, the data of file 264 may change, as new writes to the data object 270 are received, and the file system 260 allocates new blocks in the address space 262 to accommodate the new data. But the data of snapshot 266 remains stable.

One should appreciate that any number of snapshots of data object 270 may be created, at different points in time, to preserve different versions of the data object 270, and that all such snapshots, as well as the data object 270 itself, reside within blocks of the file system 260, which resolves to the single LUN 180A. Thus, the arrangement of FIG. 2 does not rely on any ability of the block storage 170 to support snapshots or large numbers of mapped LUNs, as only the single mapped LUN 180A is required to support the data object 270 and all of its snapshots. The FIG. 2 arrangement thus greatly enlarges the scope of eligible block-storage technologies that may be used successfully with the storage cluster 130. As will be shown further below, this arrangement also promotes mobility of data objects across diverse storage technologies.

Figure 3:
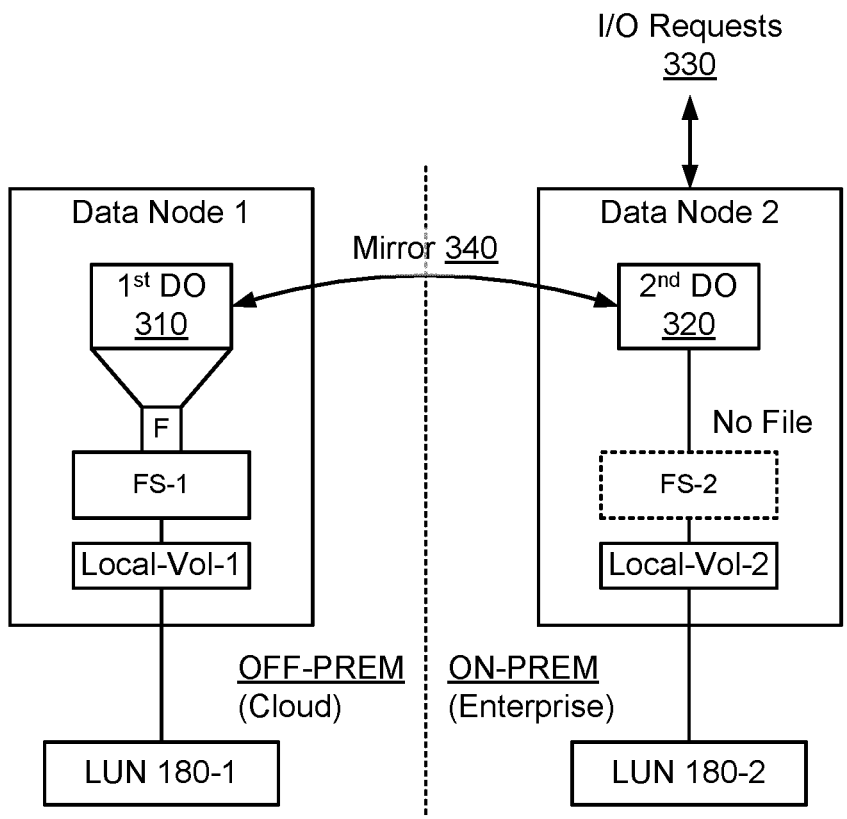
FIG. 3 is a block diagram of an example minoring arrangement between an on-prem computing node and an off-prem computing node.
Figure 4:
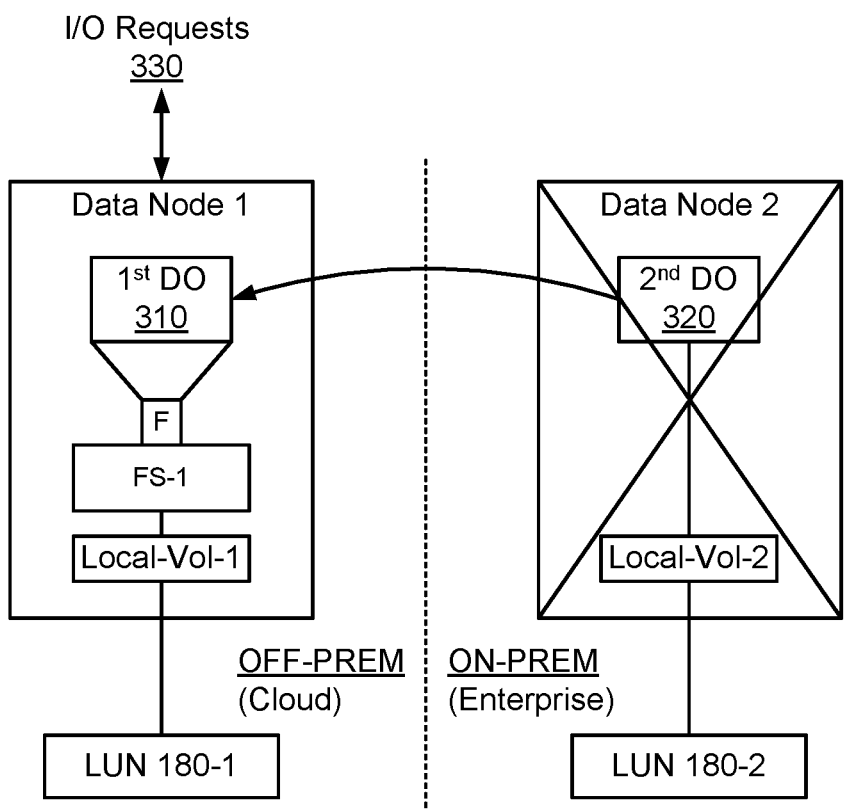
FIG. 4 is a block diagram of the arrangement of FIG. 3 in which a failover occurs from the on-prem computing node to the off-prem computing node.

FIGS. 3 and 4 show an example arrangement for mirroring a data object across different data nodes of the storage cluster 130, e.g., for supporting failover, disaster recovery, and/or load balancing. Here, NAS data node 2 resides "on-prem," i.e., on a server within a facility operated by an enterprise, such as a company or other organization. At the same time, NAS data node 1 resides "off-prem," i.e., on a server that is not part of any facility of the enterprise. In this example, data node 1 runs "in the cloud," meaning on a server of a cloud-based platform, such as Amazon Web Services (AWS), Google Cloud, or Microsoft Azure, whereas data node 2 runs on a local array, vSAN, SDS, or other facility of the enterprise.

Data object 310 on data node 1 is backed by a file F of an internal file system FS-1, which is formatted on a volume Local-Vol-1, which in turn is backed by LUN 180-1 in block storage 170, similar to the arrangement shown in FIG. 2. However, data object 320 on data node 2 is not backed by any file. Rather, data object 320 is backed by volume Local-Vol-2, which in turn is backed by LUN 180-2 in block storage 170. In this example, data node 2 requires no file because LUN 180-2 is derived from a storage technology that supports the desired number of snapshots and mapped LUNs, such that the block storage can supply the necessary snapshots on its own.

Whether data node 2 requires file system FS-2 depends on whether the data object 320 is a host-accessible file system or a LUN. FS-2 is needed if data object 320 is a host-accessible file system, as FS-2 itself provides the file system to be presented. But FS-2 is not needed if data object 320 is a host-accessible LUN, as the Local-Vol-2 may supply the LUN directly, e.g., via an iSCSI target in data node 2.

In the depicted arrangement, a mirror 340 has been established between data object 310 in data node 1 and data object 320 in data node 2. As is known, a "mirror" is an arrangement between two data objects whereby data written to either data object is mirrored to the other data object, such that the two data objects remain identical. Mirroring may be performed synchronously, e.g., for each individual write request received, or asynchronously, such that data changes are accumulated on one side and then shipped to the other, e.g., at regular intervals. In the FIG. 3 arrangement, data node 2 is active, receiving and servicing I/O requests 330 from one or more host applications 110a, whereas data node 1 is passive. To maintain the mirror, data node 2 sends any changes made to data object 320 to data node 1, which applies the changes to data object 310 to keep the two objects in sync.

At some point during operation, data node 2 may experience a fault and go offline, such as during a power failure, connection failure, software error, or system panic. As shown in FIG. 4, the failure of data node 2 results in failover to data node 1. As the mirror 340 has maintained the same data on data object 310 as was found on data object 320 prior to the fault, I/O requests 330 from a host application may continue from data node 1, with the host application experiencing little or no disruption.

One should appreciate that the failover from data node 2 to data node 1 causes the mirrored data object to be served from the cloud. Thus, a server in the cloud acts as the failover site, and operation is resumed from the cloud. Once data node 2 is restored to working order, the mirror 340 may be reestablished, such that data object 320 is made current with data object 310. Then operation may fail back to data node 2. Alternatively, operation may resume from some other node. Although FIGS. 3 and 4 show one data node using an internal file whereas the other does not, all combinations are possible, including ones in which both data nodes use internal files and ones in which neither does. Also, although the example described is one involving failover, similar activities may be used for performing load balancing or more generally for moving data for any desired reason.

Figure 5:
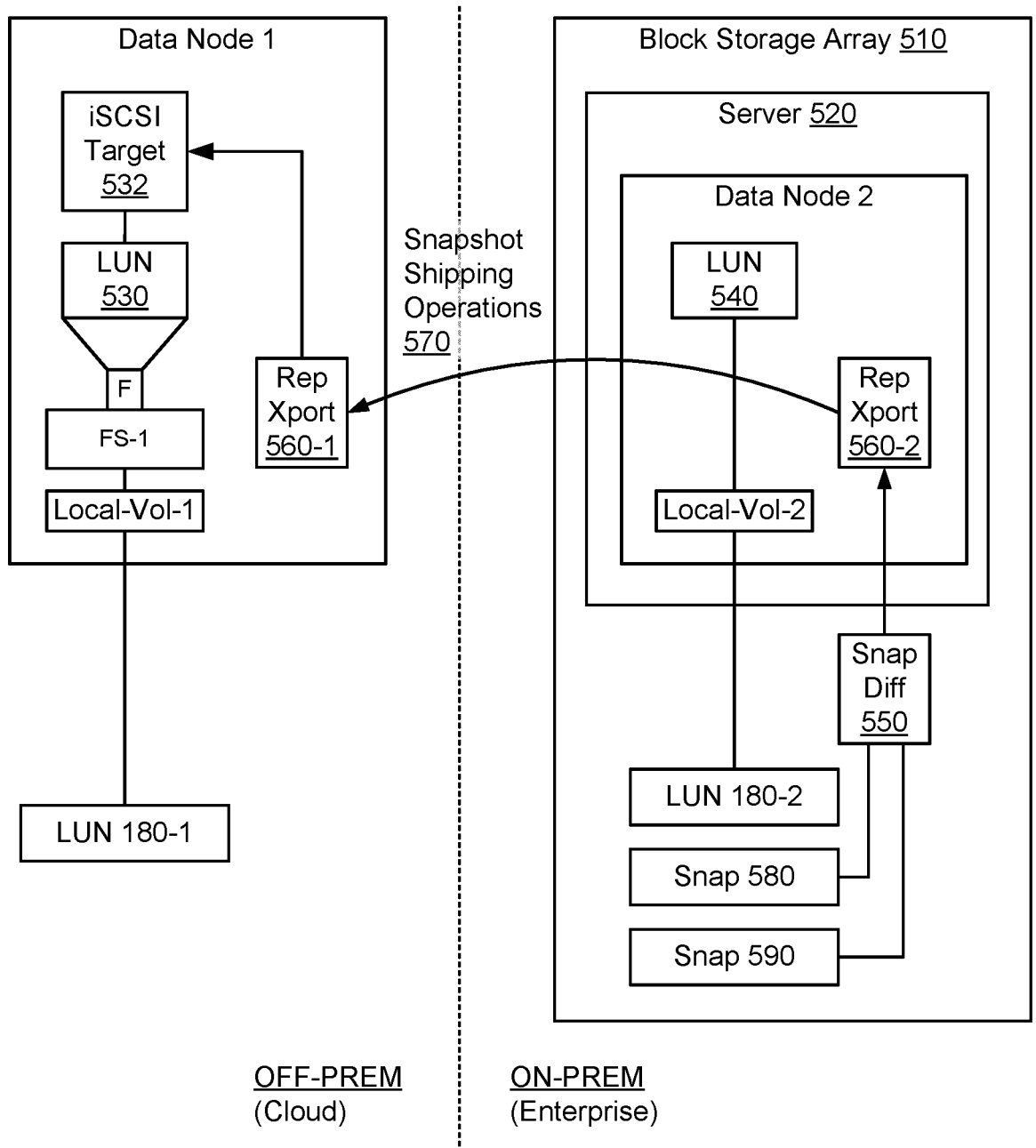
FIG. 5 is a block diagram in which the on-prem computing node runs in a storage array, without using an internal file, and maintains an off-prem replica in the cloud using snapshot shipping.

FIG. 5 shows a more specific example of FIG. 3. In FIG. 5, data node 2 runs on a server 520 within a block storage array 510, such as a Dell EMC VMAX array or some other high-performance array. The data object 320 is now shown as a host-accessible LUN 540. Back on data node 1, the data object 310 is shown as a host-accessible LUN 530.

In the FIG. 5 example, the mirror 340 is maintained between LUNs 530 and 540 using snapshot-shipping operations 570, which employ a replication transport having components 560-1 and 560-2 on data nodes 1 and 2, respectively. The array 510 is configured to support snap-diff operations 550, whereby the array 510 can itself compare consecutive snapshots to identify a difference in data between the snapshots. For example, the array 510 generates a snap-diff between a current snapshot 580 the LUN 180-2 and a previous snapshot 590 of the same LUN 180-2. Data node 2 obtains the results of the snap-diff operation 550. Replication transport component 560-2 ships the snap-diff result to replication transport component 560-1, which writes the data changes specified by the results into the LUN 530 via iSCSI target 532. If operation is transferred from data node 2 to data node 1, e.g., consequent to failover, load balancing, or the like, then data node 1 may continue to provide host application access to the same data as was found on LUN 540 from LUN 530 via iSCSI target 532. Hosting of the block-based data of LUN 540 can thus continue from the cloud.

The ability to fail over or to provide disaster recovery from the cloud affords customers with a relatively low cost and highly available solution for backing up a block-based array. Rather than having to purchase two arrays at relatively high cost, customers may instead purchase a single array and use a less expensive cloud installation as backup.

Figure 6:
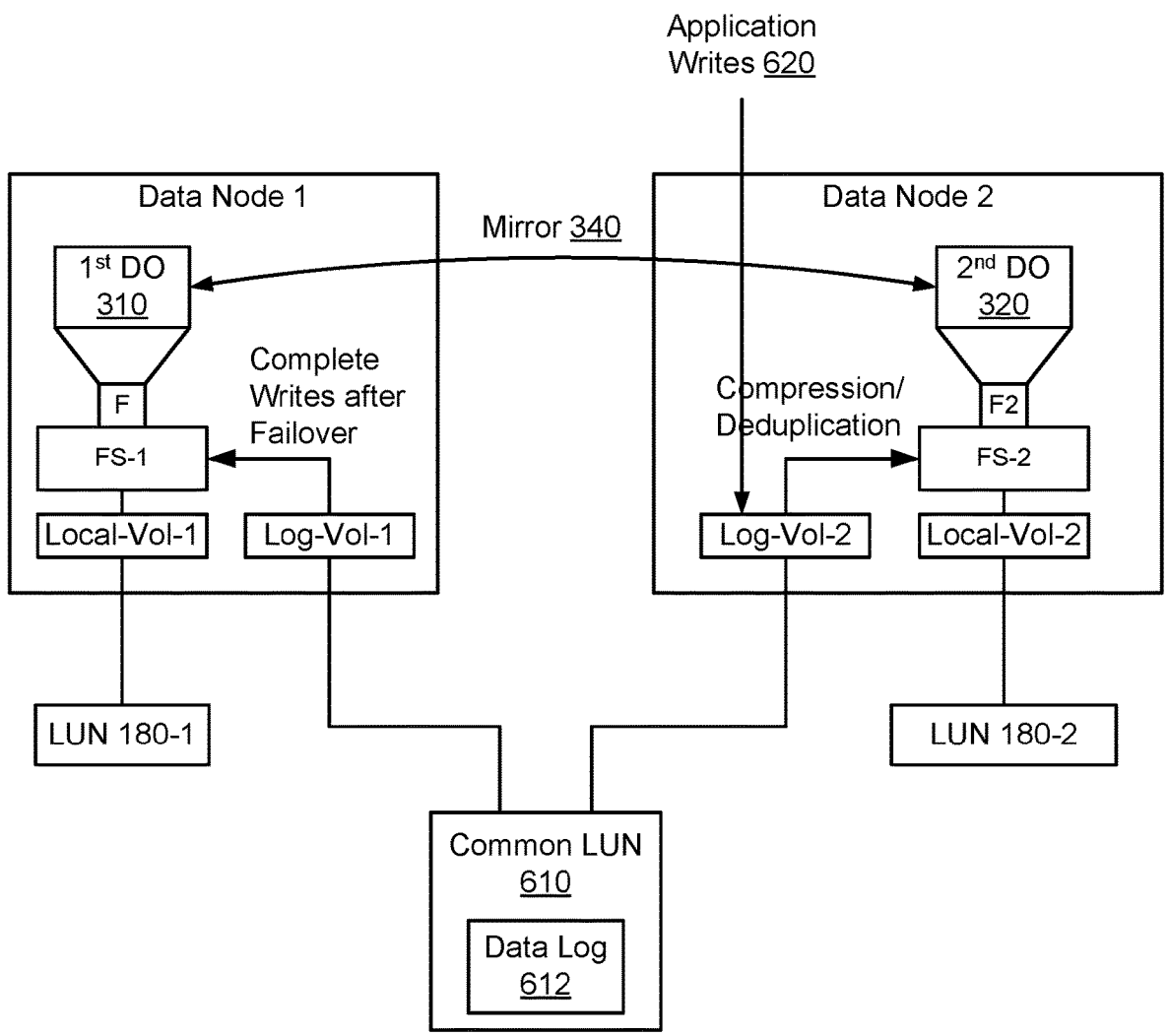
FIG. 6 is a block diagram that shows two nodes of the storage cluster connected to a common LUN that hosts a data log for supporting late binding of application writes.

FIG. 6 shows an example arrangement for supporting late binding of application writes to data objects hosted in the storage cluster 130. The arrangement of FIG. 6 is similar to that of FIG. 3, except that data node 2 now includes an internal file F2 and file system FS-2. Also, a common LUN 610 in the block storage 170 is now shared between data nodes 1 and 2, which now include log volumes Log-Vol-1 and Log-Vol-2, respectively. In an example, data node 1 and data node 2 each realize their respective log volumes by discovering LUN 610, representing the LUN 610 as a block device in their respective kernel spaces, and deploying the respective log volumes on the block devices, in a manner similar to that described in connection with FIG. 2.

Common LUN 610 stores data of a data log 612, which temporarily holds data specified in application writes 620 directed to data object 320. Data node 2 may then acknowledge completion of writes 620 once their data are received into the data log 612, even if the data are not yet placed into proper locations in FS-2.

For example, the common LUN 610 is implemented in flash or some other high-speed medium. As writes 620 directed to data object 320 arrive at data node 2, the writes are persisted in Log-Vol-2, which is backed by data log 612 and reflects its contents. In an example, data log 612 is arranged as a circular buffer having a head and a tail. Newly arriving writes are appended to the tail and older writes are flushed from the head. Flushing writes from the data log 612 involves data node 2 destaging the writes as reflected in Log-Vol-2 to properly mapped locations in FS-2.

As data are being flushed from the data log 612, data node 2 may perform various data services, such as inline compression and/or inline deduplication. For example, before placing data from the data log 612 into FS-2, data node 2 may first compress the data, such that the first placement of the data in FS-2 is of compressed data. Similarly, data node 2 may compute a hash digest from data being flushed from the data log 612. If the hash digest matches a digest stored in a digest cache (not shown), a match can be found to previously-stored data and the new data can be placed in FS-2 merely by adjusting file-system metadata, without having to store a duplicate copy of the data.

As before, a mirror 340 is established between data object 320 on data node 2 and data object 310 on data node 1. Thus, any data written to data object 320 is duplicated to data object 310, which is backed by LUN 180-1.

If a fault should occur which takes data node 2 offline, then failover may proceed as follows. Data node 1 accesses the contents of the data log 612 via Log-Vol-1 and identifies all of the pending writes which were not flushed to FS-2 before the fault caused data node 2 to go offline. Data node 1 then flushes the pending writes from the data log 612 to the file system FS-1. In the process of flushing, data node 1 may perform inline compression and/or inline deduplication, in a manner similar to that described in connection with data node 2. When all the pending writes have been flushed to FS-1, the data object 310 becomes current, and I/O requests that were previously directed to data object 320 are instead directed to data object 310. In this manner, the FIG. 6 arrangement allows the storage cluster 130 to benefit from the advantages of inline compression and deduplication. Although the transfer as described from data node 2 to data node 1 is consequent to failover, similar acts may be performed for load balancing or for achieving data mobility for any purpose. Further, although the arrangement of FIG. 6 involves two data nodes, one should appreciate that the same arrangement may be scaled up to any number of data nodes, where each of which has access to the common LUN 610.

Figure 7:
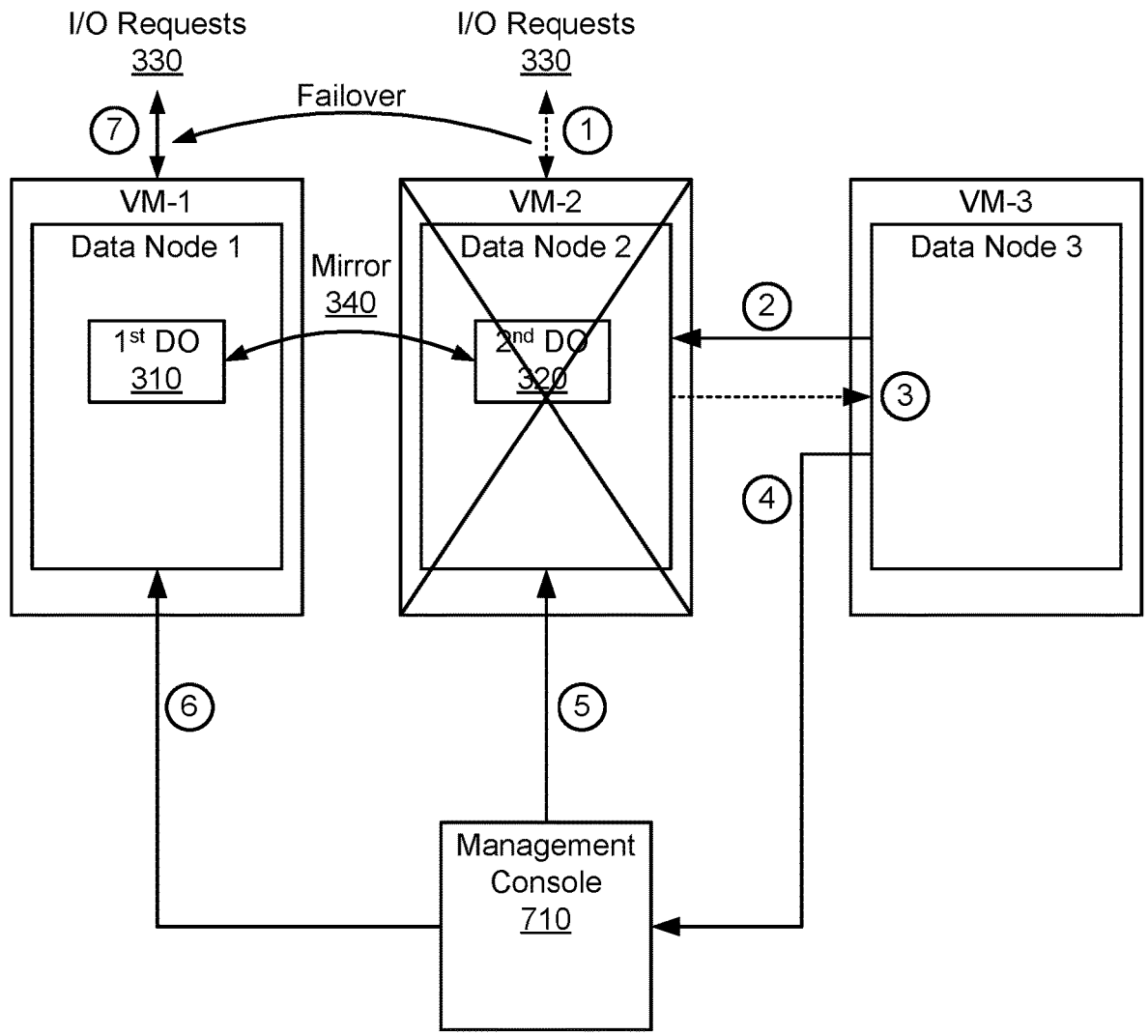
FIG. 7 is a block diagram that shows an example fencing arrangement for preventing data corruption during failover.

FIG. 7 shows another example of failover and demonstrates the role of fencing during failover to prevent data corruption. Here, three data nodes 1 to 3 are shown, and the data nodes 1 to 3 run within respective virtual machines VM-1, VM-2, and VM-3. A management console 710, such as vCenter (available from VMware of Palo Alto, Calif.), controls the virtual machines VM-1 to VM-3. The management console 710 may be integrated with the management node 140a, the administrative program 114a, and/or the storage manager 172 (FIG. 1), although this is not required. Encircled numerals in FIG. 7 show an example sequence of activities.

At (1), data node 2, which runs within VM-2, receives I/O requests 330 from one or more applications. The I/O requests 330 include reads and writes of data to data object 320. As before, mirror 340 maintains the content of data object 310 on data node 1 in sync with that of data object 320 on data node 2.

At (2), data node 3 checks whether data node 2 is still operational, e.g., by sending a ping to data node 2 and awaiting a response. If, at (3), no response is received during a specified timeout, then at (4) data node 3 notifies the management console 710 that data node 2 is down.

At (5), the management console 710 tears down VM-2. Once VM-2 has been successfully torn down or otherwise disabled, the management console 710, at (6), directs data node 1 on VM-1 to make data object 310 application-available. Finally, at (7), data node 1 begins processing I/O requests 330, completing the failover from data node 2 to data node 1.

This example sequence demonstrates a significant practical issue that arises during failover, which is to prevent multiple writers from writing to the same data object, resulting in data corruption. Here, for example, the management console 710 prevents applications from accessing data object 310 on data node 1 until it has confirmed that data node 2 on VM-2 is offline. The management console 710 thus orchestrates the handoff from VM-2 to VM-1 in a manner that prevents data node 2 and data node 1 from writing data to their respective data objects at the same time. If the arrangement were otherwise, data node 2 might still be writing to data object 320 after data object 310 was brought online. The management console 710 prevents this occurrence and resulting corruption by blocking application access to data object 310 until VM-2 has been torn down or otherwise disabled.

Figure 8:
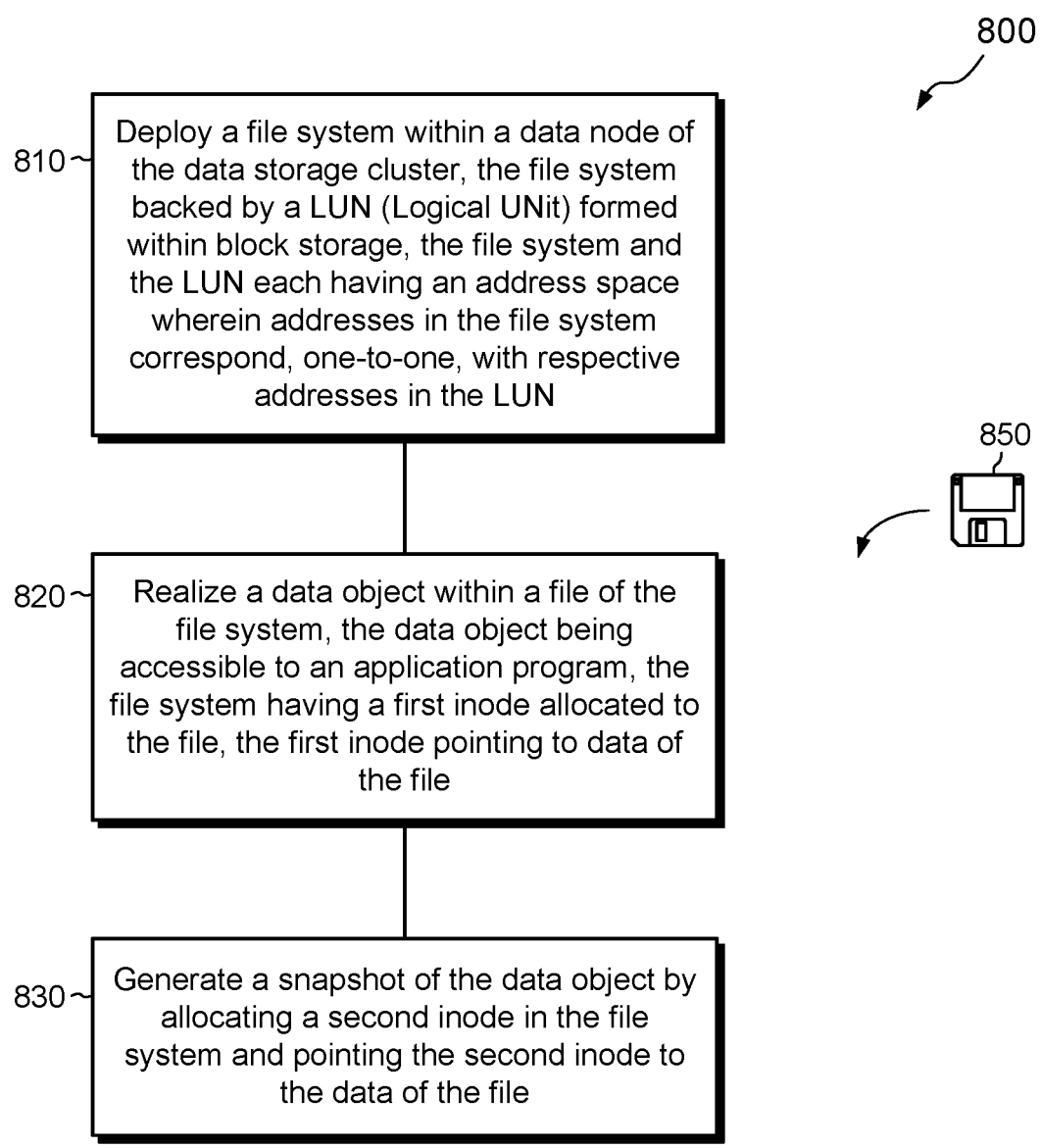
FIG. 8 is a flow chart showing an example method of managing data objects in a storage cluster.

FIG. 8 shows an example method 800 that may be carried out in connection with the environment 100. The method 800 is typically performed, for example, by the software constructs described in connection with FIGS. 1 and 2, which reside in the memories 220 of the NAS data nodes 140b and are run by the respective sets of processing units 212. The various acts of method 800 may be ordered in any suitable way. Accordingly, embodiments may be constructed in which acts are performed in orders different from that illustrated, which may include performing some acts simultaneously.

At 810, a file system 260 is deployed within a data node 140b of the data storage cluster 130. The file system 260 is backed by a LUN (Logical UNit) 180A formed within block storage 170. The file system 260 and the LUN 180A each have an address space 262 wherein addresses in the file system 260 correspond, one-to-one, with respective addresses in the LUN 180A.

At 820, a data object 270 is realized within a file 264 of the file system 260. The data object 270 is accessible to an application program 110a. The file system 260 has a first inode I1 allocated to the file 264, and the first inode I1 points to data 268 of the file 264.

At 830, a snapshot 266 of the data object 270 is generated by allocating a second inode I2 in the file system 260 and pointing the second inode I2 to the data 268 of the file 264.

An improved technique has been described for managing data objects in a data storage cluster 130. The technique realizes an application-accessible data object 270 within a file 264 that belongs to an internal file system 260. The internal file system 260 runs on a computing node 140b of the cluster 130 and is backed by a LUN 180A realized in block storage 170. The storage cluster 130 achieves snapshots 266 of the data object 270 at the level of the file system 260, e.g., by snapshotting the file 264, such that the data object 270 and its snapshots 266 are all backed by the same LUN 180A in the block storage 270. As a result, any dependency on the block storage 170 for snapshots is removed, as the computing node 140b performs the snapshots 266 instead of the block storage 170 and depends only upon a single LUN 180A from the block storage 170 to back the data object 270 and its snapshots 266.

Having described certain embodiments, numerous alternative embodiments or variations can be made. For example, although embodiments have been shown and described in connection with a particular storage cluster 130 that has certain specific features, these features are intended merely to be illustrative of an example context and should not be construed as limiting. Also, although the example cluster 130 supports hosting of both application-accessible file systems and application-accessible LUNs, embodiments are not limited to these types of data objects, nor is it required that a storage cluster provide application-access to both file systems and LUNs. Further, although examples have been shown for achieving data mobility across the cluster 130 of individual host-accessible file systems and LUNs, mobility may also be achieved at the level of the VDM (Virtual Data Mover) or NAS server, where each VDM or NAS server may include any number of host-accessible file systems and/or LUNs, and where each host-accessible file system or LUN in a VDM or NAS server may map to a respective LUN 180 in block storage 170.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 850 in FIG. 8). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing data objects in a data storage cluster, the method comprising:
    deploying a file system within a first data node of the data storage cluster, the file system backed by a LUN (Logical UNit) formed within block storage, the file system and the LUN each having an address space wherein addresses in the file system correspond, one-to-one, with respective addresses in the LUN;
    realizing a first data object within a file of the file system, the first data object being accessible to an application program, the file system having a first inode allocated to the file, the first inode pointing to data of the file; and
    generating a snapshot of the first data object by allocating a second inode in the file system and pointing the second inode to the data of the file,
    wherein the first data object realized within the file is one of an application-accessible file system and an application-accessible LUN, and wherein the method further comprises maintaining a mirror between the first data object and a second data object operated on a second node of the data storage cluster.

2. The method of claim 1, wherein the file system maps both the first data object and the snapshot to the LUN, such that the LUN stores data of both the first data object and the snapshot.

3. The method of claim 1, further comprising operating the second data object on the second node without realizing the second data object within a file.

4. The method of claim 1, further comprising (i) operating the first node on a server of a cloud provider off premises of an enterprise and (ii) operating the second node on premises of the enterprise.

5. The method of claim 4, further comprising:
    providing application access to the second data object operating on the second node; and
    upon a failure of the second node, failing over from the second node to the first node, such that data of the second data object becomes application-accessible from the first data object running on the first node in the cloud.

6. The method of claim 4, wherein the second node runs within a server of a block-storage array, and wherein maintaining the mirror includes performing snapshot shipping operations from the second node to the first node, such that the first data object serves as a replica of the second data object.

7. The method of claim 6, wherein the second data object is backed by a second LUN formed within the block-storage array, and wherein performing the snapshot shipping operations includes directing the block-storage array to generate a snap-difference between consecutive snapshots of the second LUN and shipping the snap-difference to the first node, the first node then updating the first data object with the snap-difference.

8. The method of claim 1, further comprising:
    realizing a common LUN within the block storage;
    mapping the common LUN to both the first node and the second node, such that the common LUN is accessible to both the first node and the second node; and
    implementing a data log within the common LUN, the data log temporarily storing data specified by writes directed to the second data object until the first node has placed the data specified by the writes into the second data object.

9. The method of claim 8, further comprising performing at least one of (i) a compression operation and (ii) a deduplication operation when placing the data specified by the writes into the second data object.

10. The method of claim 8, further comprising, upon a failover from the second node to the first node, completing the writes of the data temporarily stored in the data log to the first data object.

11. The method of claim 1, wherein the first node operates within a first virtual machine, wherein the second node operates within a second virtual machine, and wherein the method further comprises:
    detecting, by a third node of the data storage cluster, an offline condition of the second node, the third node thereafter directing a management console to tear down the second virtual machine; and
    blocking application access to the first data object within the first virtual machine until after the management console has torn down the second virtual machine.

12. A data storage cluster, comprising multiple data nodes, including a first data node having control circuitry that includes a set of processing units coupled to memory, the control circuitry constructed and arranged to:
    deploy a file system within the first data node of the data storage cluster, the file system backed by a LUN (Logical UNit) formed within block storage, the file system and the LUN each having an address space wherein addresses in the file system correspond, one-to-one, with respective addresses in the LUN;
    realize a first data object within a file of the file system, the first data object being accessible to an application program, the file system having a first inode allocated to the file, the first inode pointing to data of the file; and generate a snapshot of the first data object by allocating a second inode in the file system and pointing the second inode to the data of the file, wherein the first data object realized within the file is one of an application-accessible file system and an application-accessible LUN, and wherein the method further comprises maintaining a mirror between the first data object and a second data object operated on a second node of the data storage cluster.

13. A computer program product including a set of non-transitory, computer-readable media having instructions which, when executed by control circuitry of a first data node of a data storage cluster, cause the control circuitry to perform a method of managing data objects in the data storage cluster, the method comprising:

deploying a file system within the first data node of the data storage cluster, the file system backed by a LUN (Logical UNit) formed within block storage, the file system and the LUN each having an address space wherein addresses in the file system correspond, one-to-one, with respective addresses in the LUN;

realizing a first data object within a file of the file system, the first data object being accessible to an application program, the file system having a first inode allocated to the file, the first inode pointing to data of the file; and generating a snapshot of the first data object by allocating a second inode in the file system and pointing the second inode to the data of the file, wherein the first data object realized within the file is one of an application-accessible file system and an application-accessible LUN, and wherein the method further comprises maintaining a mirror between the first data object and a second data object operated on a second node of the data storage cluster.

14. The computer program product of claim 13, wherein the file system maps both the first data object and the snapshot to the LUN, such that the LUN stores data of both the first data object and the snapshot.

15. The computer program product of claim 14, wherein the method further comprises:

operating the second data object on the second node without realizing the second data object within a file.

16. The computer program product of claim 15, wherein the method further comprises:

operating the first node on a server of a cloud provider off premises of an enterprise;

operating the second node on premises of the enterprise;

providing application access to the second data object operating on the second node; and upon a failure of the second node, failing over from the second node to the first node, such that data of the second data object becomes application-accessible from the first data object running on the first node in the cloud.

17. The computer program product of claim 15, wherein the method further comprises:

realizing a common LUN within the block storage;

mapping the common LUN to both the first node and the second node, such that the common LUN is accessible to both the first node and the second node;

implementing a data log within the common LUN, the data log temporarily storing data specified by writes directed to the second data object until the first node has placed the data specified by the writes into the second data object; and performing at least one of (i) a compression operation and (ii) a deduplication operation when placing the data specified by the writes into the second data object.

18. The computer program product of claim 17, wherein the method further comprises, upon a failover from the second node to the first node, completing the writes of the data temporarily stored in the data log to the first data object.

* * * * *